US007206195B2

(12) United States Patent
Takahashi et al.

(10) Patent No.: US 7,206,195 B2
(45) Date of Patent: Apr. 17, 2007

(54) DISPLAY AND REMOTE CONTROLLER INCLUDING DISPLAY

(75) Inventors: Masahiro Takahashi, Hirakata (JP); Tetsuro Hanahara, Tsuruga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 243 days.

(21) Appl. No.: 10/901,854

(22) Filed: Jul. 28, 2004

(65) Prior Publication Data

US 2005/0063128 A1 Mar. 24, 2005

(30) Foreign Application Priority Data

Aug. 29, 2003 (JP) ............................ 2003-306626

(51) Int. Cl.
*G06F 1/16* (2006.01)

(52) U.S. Cl. ...................................... 361/681; 361/679

(58) Field of Classification Search ......... 361/679–681
See application file for complete search history.

(56) References Cited

U.S. PATENT DOCUMENTS 6,532,152 B1 * 3/2003 White et al. ................ 361/692
2006/0146486 A1 * 7/2006 Wikstrom et al. .......... 361/681

FOREIGN PATENT DOCUMENTS

JP 03-173198 A 7/1991

* cited by examiner

*Primary Examiner*—Yean-Hsi Chang
(74) *Attorney, Agent, or Firm*—RatnerPrestia

(57) ABSTRACT

A display includes a case having an opening provided therein, a holding portion provided on the case and having a frame shape provided around the opening, a display device accommodated in the holding portion, a circuit board accommodated in the case, a connector for connecting the display device to the circuit board, and an elastic portion provided at the holding portion for urging the display device. The holding portion has a side directing towards an inside of the frame shape. The display device includes plural electrodes arranged in a predetermined direction. The display device has a side contacting the side of the holding portion. The side of the display device faces the side of the holding portion in the predetermined direction. The circuit board includes plural conductors arranged in the predetermined direction. The connector connects the electrodes of the display device to the conductors of the circuit board, respectively.

19 Claims, 5 Drawing Sheets

DISPLAY AND REMOTE CONTROLLER INCLUDING DISPLAY

FIELD OF THE INVENTION

The present invention relates to a remote controller for remotely controlling an electronic apparatus, such as a television receiver, a video recorder/player, or an air conditioner, and a display used in the remote controller.

BACKGROUND OF THE INVENTION

Electronic apparatuses, such as television receivers, video recorder/players, and air conditioners, are recently developed to have improved versatility and functional characteristics. Japanese Patent Laid-Open Publication No. 3-173198 discloses a display installed in a remote controller for remotely controlling an operation of an electronic apparatus. The controller includes a display for displaying images and patterns in addition to numerals and characters and for allowing a user to manipulate the remote controller.

Such conventional display and a conventional remote controller including the display will be explained.

FIG. 3 is a cross sectional view of the conventional remote controller. FIG. 4 is an exploded perspective view of the controller. The controller includes a case 1 having a substantial box-shape and made of insulating resin material, such as polystyrene or ABS, and has an opening 1A and through holes 1B provided in a bottom 1D thereof. The case 1 has a frame shaped holding portion 1C thereof provided around the opening 1A and projecting from the bottom 1D. The controller further includes a circuit board 2 made of insulating material, such as paper phenol or glass epoxy, and having wiring patterns (not shown) made of conductive material, such as copper provided on upper side 2C and lower side 2D. Conductors 2A are arranged on the lower side 2D at predetermined intervals. The circuit board 2 is accommodated in case 1 and joined with screws to the case 1 as to cover the top of the case 1. A display device 3, such as a liquid crystal display, includes electrodes 3A arranged on the upper side of the device at the predetermined intervals. The display device 3 is slightly smaller than the holding portion 1C of the case 1, hence being securely accommodated in the holding portion 1C while a display surface of the device is exposed from the opening 1A.

The display device 3 for displaying numerals and characters may have an interval of about 1.5 mm between electrodes 3A. The display device 3 adapted to display images and patterns, such as icons, may have a smaller interval since including more electrodes 3A for precise display.

An elastic connector 4 includes conductive layers 4A and insulating layers 4B. The conductive layer 4A is made of elastic material, such as silicone rubber, having conductive particles, such as carbons, dispersed therein. The insulating layer 4B is made of elastic and insulating material, such as silicone rubber. The conductive layers 4A and the insulating layers 4B are alternately placed in a arranging direction of the electrodes 3A. The elastic connector 4 is mounted between the circuit board 2 and the display device 3 while slightly deflecting. The conductive layers 4A have their upper and lower ends elastically urged and contacting the conductors 2A and the electrodes 3A, respectively, hence electrically connecting the conductors 2A to the electrodes 3A, respectively, for activating the display device 3.

An operating member 5 is made of elastic material, such as silicone rubber or elastomer, and accommodated in the case 1. The operating member 5 has movable contacts 5A made of conductive material, such as carbon, provided on an upper side of the member 5 and has dome shaped pressing portions 5B provided on the lower side of the member 5. The pressing portions 5B project outward from the through-holes 1B of the case 1.

The circuit board 2 has fixed contacts (not shown) provided on the lower side 2D of the board 2. The fixed contacts face movable contacts 5A of the operating member 5 corresponding to the fixed contacts and are distanced from the contacts 5A by a predetermined distance. Electronic components, such as light emitting diodes 6A and microcomputers (not shown) are mounted on the lower side 2D of the circuit board 2 and provides a control circuit 6 for transmitting a remote control signal, thus providing the conventional remote controller.

The conventional remote controller is directed towards an electronic apparatus, such as a television receiver, a video recorder/player, or an air conditioner. Then, pressing portions 5B are activated to, for example, turn on and off the apparatus and control volume of sound. Upon the pressing portion 5B being depressed, movable contact 5A corresponding to the portion 5B contacts the fixed contact, thereby having control circuit 6 to transmit infrared ray signals to the electronic apparatus to be controlled. Upon receiving the signals, the electronic apparatus is remotely controlled to operate, for, example, is turned on and off and has volume of sounds controlled.

In order to set a time for starting and stopping of recording a program, a user operates the pressing portion 5B while monitoring the starting time and the stopping time displayed on the display device 3. Then, infrared ray signals representing the starting time and the stopping time are transmitted to the electronic apparatus to record the starting time and the stopping time in the apparatus, thereby allowing the apparatus to execute predetermined operations at the starting time and the stopping time.

The conventional remote controller may, however, cause the display device 3 to be displaced in the holding portion 1C of the case 1 or the circuit board 2 to be dislocated in the case 1. Particularly when the display device 3 includes electrodes 3A aligned at small intervals as to be adapted to display images or patterns, such as icons, the electrodes 3A of the display device 3 are displaced with respect to the conductors 2A of the circuit board 2 connected with the elastic connector 4. This may make electrical connection between the display device 3 and the circuit board 2 unstable.

SUMMARY OF THE INVENTION

A display includes a case having an opening provided therein, a holding portion provided on the case and having a frame shape provided around the opening, a display device accommodated in the holding portion, a circuit board accommodated in the case, a connector for connecting the display device to the circuit board, and an elastic portion provided at the holding portion for urging the display device. The holding portion has a side directing towards an inside of the frame shape. The display device includes plural electrodes arranged in a predetermined direction. The display device has a side contacting the side of the holding portion. The side of the display device faces the side of the holding portion in the predetermined direction. The circuit board includes plural conductors arranged in the predetermined direction. The connector connects the electrodes of the display device to the conductors of the circuit board, respectively. The elastic portion urges the display device towards the side of the holding portion in the predetermined direction.

In the display and a remote control transmitter using the display, the display device is securely held and electrically connected stably.

DESCRIPTION OF THE PREFERRED EMBODIMENTS

Figure 1:
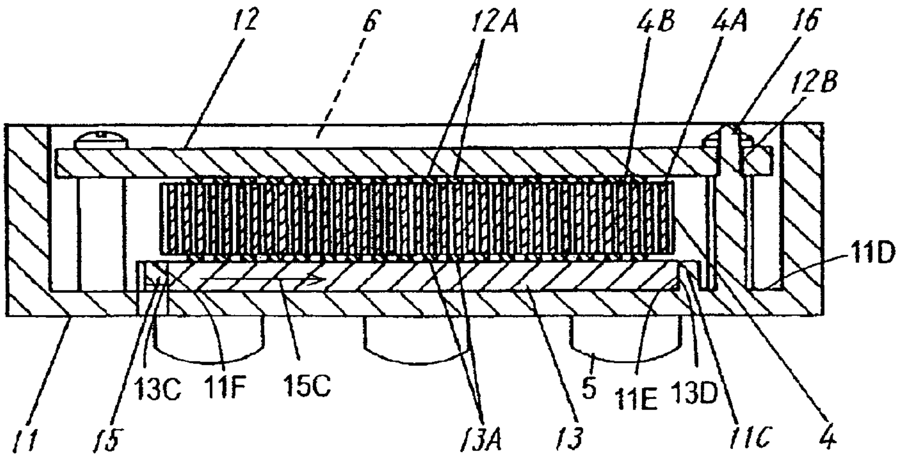
FIG. 1 is a cross sectional view of a remote controller according to an exemplary embodiment of the present invention.
Figure 2A:
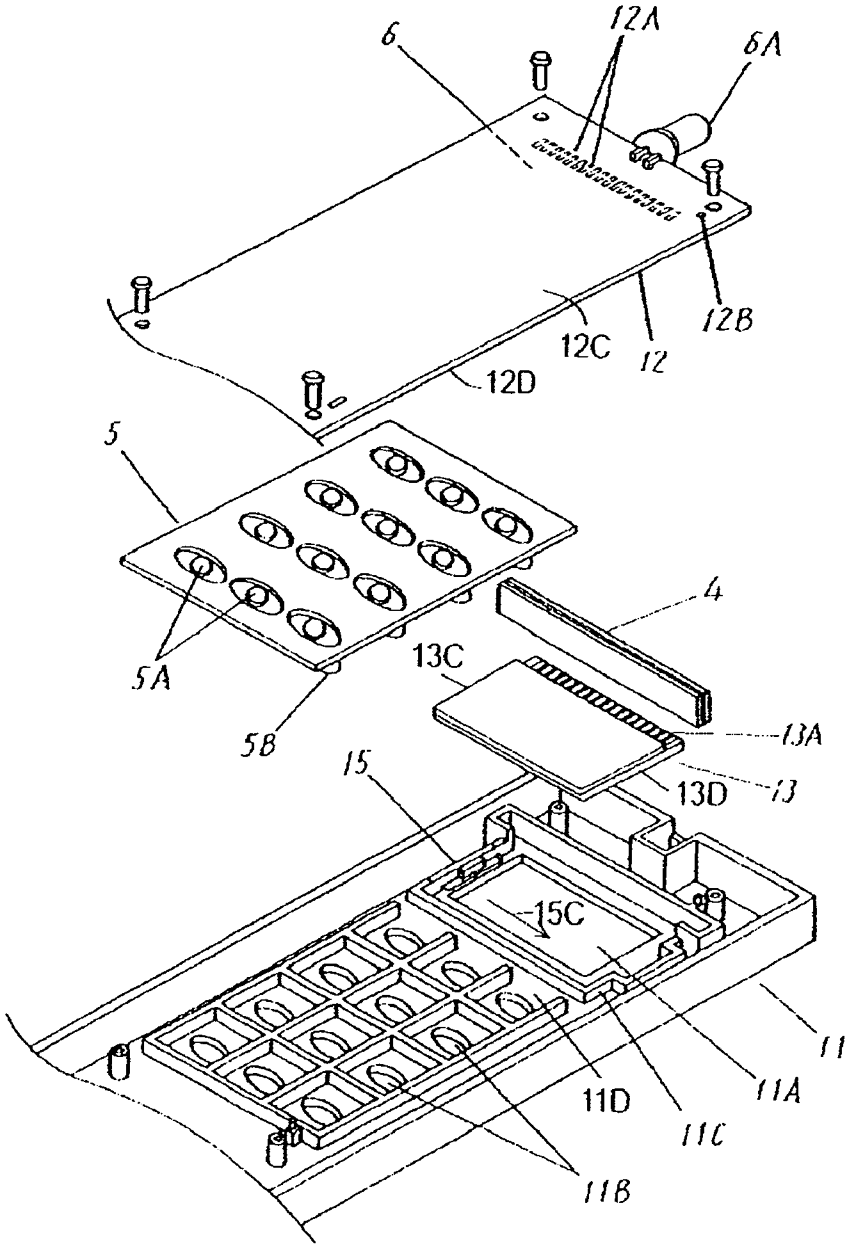
FIG. 2A is an exploded perspective view of the remote controller according to the embodiment.
Figure 2B:
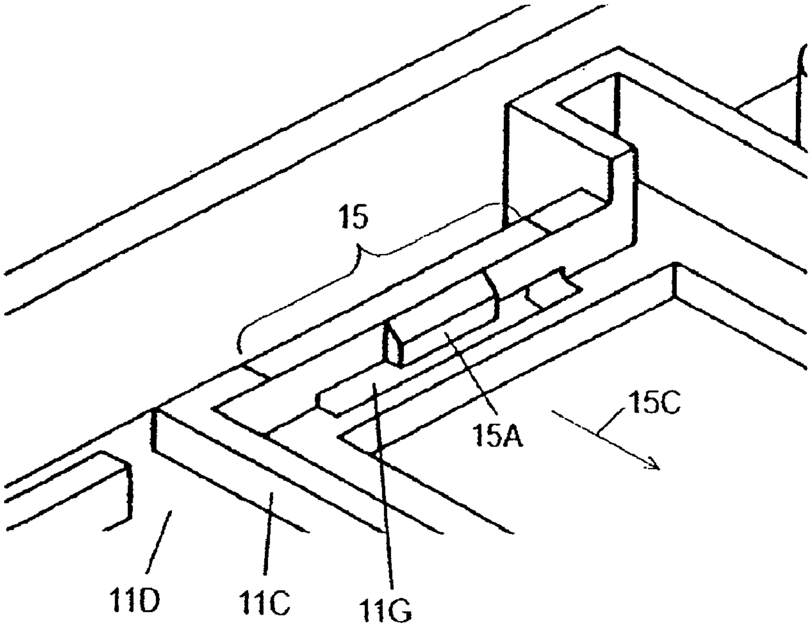
FIG. 2B is an enlarged and exploded perspective view of the remote controller according to the embodiment.
Figure 3:
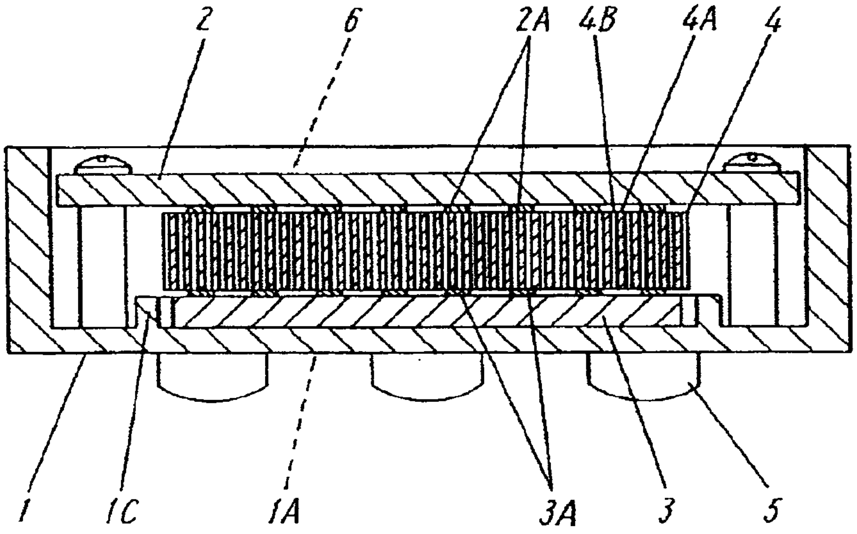
Fig. 3 PRIOR ART
FIG. 3 is a cross sectional view of a conventional remote controller.
Figure 4:
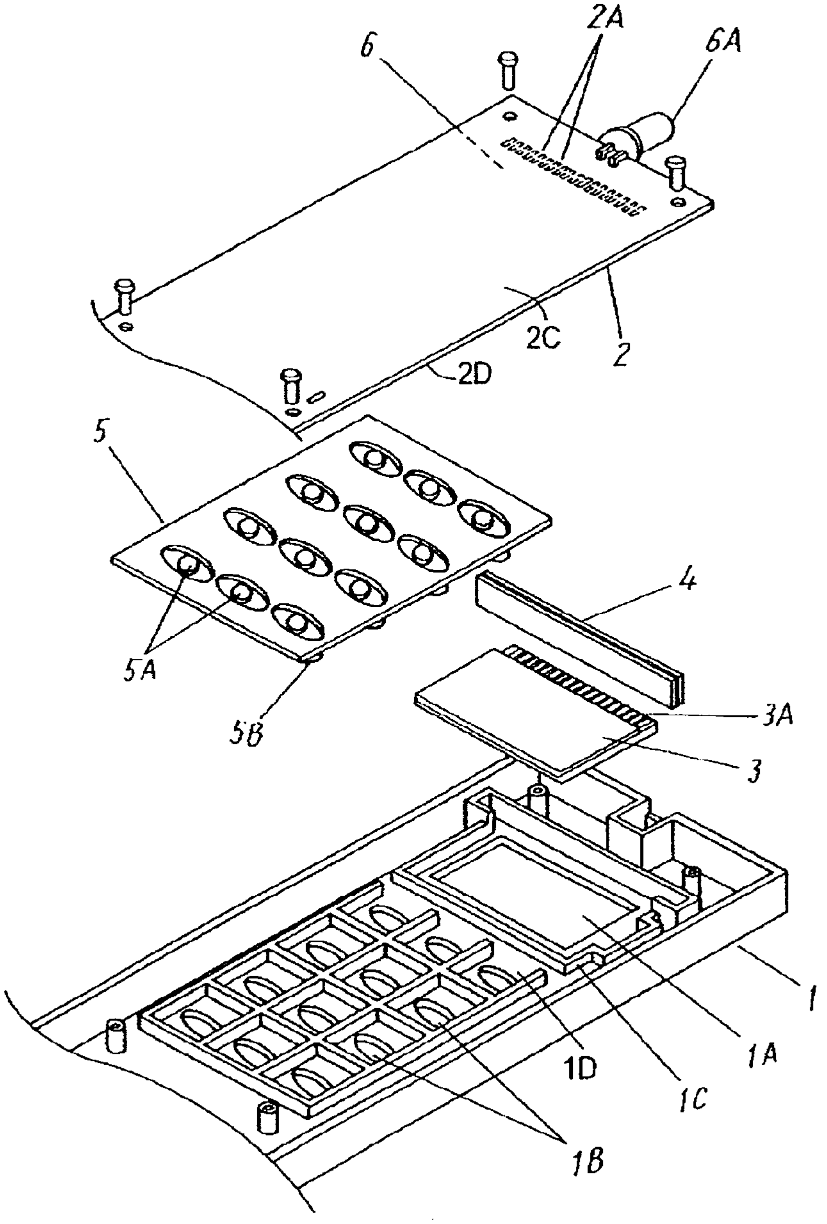
Fig. 4 PRIOR ART
FIG. 4 is an exploded perspective view of the conventional remote controller.

FIG. 1 is a cross sectional view of a remote controller according to an exemplary embodiment of the present invention. FIGS. 2A and 2B are exploded perspective views of the remote controller. A case 11 is made of insulating resin, such as polystyrene or ABS, having substantially a box shape. The case 11 has an opening 11A and through-holes 11B provided in the bottom surface 11D of the case, and has a holding portion 11C having a frame shape. The holding portion is provided around the opening 11A and projects from the bottom surface 11D.

A slot 11G is provided at the left and lower portion of the holding portion 11C, thereby providing a thin, elastic portion 15 at the left side of the portion 11C. The elastic portion 15 is not connected to an inner surface 11D of the case 11. The elastic portion 15 has a projection 15A projecting inward of the holding portion 11C having the frame shape. A positioning portion 16 having a column shape extending upward is provided at the right of the holding portion 11C of the case 11.

A circuit board 12 made of insulating material, such as paper phenol or glass epoxy, has wiring patterns (not shown) made of conductive material, such as copper, mounted on upper side 12C and lower side 12D. Conductors 12A are mounted on the lower side 12D and arranged by predetermined intervals. The positioning portion 16 is inserted into a positioning hole 12B provided at the right in the circuit board 12, thereby allowing the circuit board 12 to be accommodated in the case and to be joined with screws to the case 11 so as to cover the top of the case 11.

A display device 13, such as a liquid crystal display, has electrodes 13A mounted on the upper side of the device and arranged at the predetermined intervals in a direction 15C. The display device 13 is securely accommodated in the holding portion 11C of the case 11 while having a display surface exposed from the opening 11A.

The elastic portion 15 is provided at an inner, left side of the holding portion 11C and has the projection 15A projecting in the direction 15C. The slot 11G allows the elastic portion 15 not to be connected to the surface 11D, hence allowing the elastic portion 15 to elastically deform in the direction 15C. While the display device 13 is accommodated in the holding portion 11C of the case 11, the projection 15A elastically contacts a left side 13C of the device 13 while the elastic portion 15 slightly deflects. This arrangement allows the right side 13D of the display device 13 to press against the inner side 11E at the right of the holding portion 11C of the case 11. Then, the display device 13 is urged against the inner side 11E in the direction 15C along which the electrodes 13A are arranged, and thus is accommodated in the holding portion 11C securely.

An elastic connector 4 includes conductive layers 4A made of elastic material, such as silicone rubber, having conductive particle, such as carbons, dispersed therein, and includes insulating layers 4B made of elastic material, such as silicone rubber. The conductive layers 4A and the insulating layers 4B are alternately placed along a direction along which the electrodes 13A are arranged. The elastic connector 4 is mounted between the circuit board 12 and the display device 13 while slightly deflecting. The conductive layers 4A of the elastic connector 4 has upper and lower ends elastically urged against the conductors 12A and the electrodes 13A, respectively, thereby ensuring electrical connection between the conductors 12A and the electrodes 13A. That is, each conductive layer 4A contacts both of each conductor 12A and each electrode 13A, but are not fixed to the conductor 12A or the electrode 13A by an ordinary connecting method, such as soldering, pressing, or welding. The conductive layer 4A may be fixed to one of the conductor 12A and the electrode 13A by the ordinary connecting method As described, the positioning portion 16 is inserted into the positioning hole 12B of the circuit board 12 to position the board 12 in the case 11. The display device 13 is accommodated in the case 11 while having a side urged by the elastic portion 15 against the inner side 11E at the right of the holding portion 11C of the case 11.

Accordingly, the display device 13 is not displaced in the case 11 while the circuit board 12 is securely positioned in the case 11. The electrodes 13A of the display device 13 arranged at small intervals for displaying images and patterns, such as icons, is electrically connected stably to the conductors 12A of the circuit board 12 arranged at the small intervals since the electrodes 13A are not displaced against the electrodes 12A, respectively.

An operating member 5 is made of flexible material, such as silicone rubber or elastomer, and accommodated in the case 11. The operating member 5 has movable contacts 5A made of conductive material, such as carbon, mounted on the upper side of the member 5, and has dome shaped pressing portions 5B provided on the lower side of the member 5. The pressing portions 5B project outward from the through-holes 11B of the case 11, respectively.

The circuit board 12 has fixed contacts (not shown) provided on the lower side 12D of the board 12. The fixed contacts face movable contacts 5A of the operating member 5 corresponding to the fixed contacts and are distanced from the contacts 5A by a predetermined distance. Electronic components, such as light emitting diodes 6A and microcomputers (not shown) are mounted on the lower side 12D of the circuit board 12 and provides a control circuit 6 for transmitting a remote control signal, thus providing the conventional remote controller.

The remote controller is directed towards an electronic apparatus, such as a television receiver, a video recorder/player, or an air conditioner. Then, pressing portions 5B are activated to, for example, turn on and off the apparatus and control volume of sound. Upon the pressing portion 5B being depressed, movable contact 5A corresponding to the portion 5B contacts the fixed contact, thereby having control circuit 6 to transmit infrared ray signals to the electronic apparatus to be controlled. Upon receiving the signals, the electronic apparatus is remotely controlled to operate, for, example, is turned on and off and has volume of sounds controlled.

In order to set a time for starting and stopping of recording a program, a user operates the pressing portion 5B while monitoring the starting time and the stopping time displayed on the display device 13. Then, infrared ray signals representing the starting time and the stopping time are transmitted to the electronic apparatus to record the starting time and the stopping time in the apparatus, thereby allowing the apparatus to execute predetermined operations at the starting time and the stopping time.

According to the embodiment, the display device 13 is secured but not dislocated in the holding portion 11C of the case 11, hence being electrically connected to the circuit board 12 via the conductive layers 4A of the elastic connector 4.

According to the embodiment, the positioning portion 16 is located at the right of the holding portion 11C of the case 11 and near the electrodes 13A of the display device 13. The circuit board 12 is positioned in the case 11 while the positioning hole 12B accepts the positioning portion 16. This structure allows the electrodes 13A of the display device 13 to locate precisely against the conductors 12A of the circuit board 12.

As described, the display device 13 is urged in the direction 15C by the thin elastic portion 13 provided on a side at the left of the holding portion 11C of the case 11. The elastic portion 15 may be made of elastic material, such as rubber, provided separately from the case 11. The material may be injected between the holding portion 11C and the left side 13C of the display device 13 to urge the display device 13 in the direction 15C.

What is claimed is:

1. A display comprising:

a case having an opening provided therein;

a holding portion provided on the case and having a frame shape provided around the opening, the holding portion having a first side directing towards an inside of the frame shape;

a display device accommodated in the holding portion, the display device including a plurality of electrodes arranged in a predetermined direction, the display device having a side contacting the first side of the holding portion, the side of the display device facing the first side of the holding portion in the predetermined direction;

a circuit board accommodated in the case, the circuit board including a plurality of conductors arranged in the predetermined direction;

a connector for electrically connecting the electrodes of the display device to the conductors of the circuit board, respectively; and an elastic portion provided at the holding portion for urging the display device towards the first side of the holding portion in the predetermined direction.

2. The display according to claim 1, wherein the connector is elastic.

3. The display according to claim 1, wherein the connector includes a plurality of conductive layers for electrically connecting the electrodes of the display device to the conductors of the circuit board, and a plurality of insulating layers placed alternately on the conductive layers.

4. The display according to claim 1, further comprising a positioning portion for positioning the circuit board, the positioning portion being provided on the case and near the electrodes of the display device.

5. The display according to claim 1, wherein the holding portion further has a second side directing towards the inside of the frame shape, the second side of the holding portion being opposite to the first side of the holding portion, and wherein the elastic portion is provided at the second side of the holding portion.

6. The display according to claim 1, wherein the opening is located between the first side of the holding portion and the second side of the holding portion.

7. The display according to claim 1, wherein the case has a bottom surface having the opening provided therein, wherein the case includes the holding portion unitarily provided with the case, and wherein the first side of the holding portion protrudes from the bottom surface of the case.

8. The display according to claim 7, wherein the elastic portion has a projection towards the display device for urging the display device towards the first side of the holding portion.

9. The display according to claim 1, wherein the holding portion has a portion functioning as the elastic portion, the holding portion having a slot therein which delineates the elastic portion.

10. A remote controller comprising:

a case having an opening provided therein;

a holding portion provided on the case and having a frame shape provided around the opening, the holding portion having a first side directing towards an inside of the frame shape;

a display device accommodated in the holding portion, the display device including a plurality of electrodes arranged in a predetermined direction, the display device having a side contacting the first side of the holding portion, the side of the display device facing the first side of the holding portion in the predetermined direction;

a circuit board accommodated in the case, the circuit board including a plurality of conductors arranged in the predetermined direction, the conductors being connected to the electrodes of the display device, respectively;

a connector for electrically connecting the electrodes of the display device to the conductors of the circuit board;

an elastic portion provided at the holding portion for urging the display device towards the first side of the holding portion in the predetermined direction;

an operating portion; and a circuit accommodated in the case, the circuit being operable to transmit a signal according to a manipulation to the operating portion.

11. The remote controller according to claim 10, wherein the connector is elastic.

12. The remote controller according to claim 10, wherein the connector includes a plurality of conductive layers for electrically connecting the electrodes of the display device to the conductors of the circuit board, and a plurality of insulating layers placed alternately on the conductive layers.

13. The remote controller according to claim 10, further comprising a positioning portion for positioning the circuit board, the positioning portion being provided on the case and near the electrodes of the display device.

14. The remote controller according to claim 10, wherein the circuit is mounted to the circuit board.

15. The remote controller according to claim 10, wherein the holding portion further has a second side directing towards the inside of the frame shape, the second side of the holding portion being opposite to the first side of the holding portion, and wherein the elastic portion is provided at the second side of the holding portion.

16. The remote controller according to claim 15, wherein the elastic portion has a projection toward the display device for urging the display device towards the first side of the holding portion.

17. The remote controller according to claim 10, wherein the case has a bottom surface having the opening provided therein, wherein the case includes the holding portion unitarily provided with the case, and wherein the first side of the holding portion protrudes from the bottom surface of the case.

18. The remote controller according to claim 10, wherein the holding portion has a portion functioning as the elastic portion, the holding portion having a slot therein which delineates the elastic portion.

19. The remote controller according to claim 18, wherein the elastic portion has a projection towards the display device for urging the display device towards the first side of the holding portion.

* * * * *